United States Patent
Szulyk

(10) Patent No.: US 6,919,702 B2
(45) Date of Patent: Jul. 19, 2005

(54) SYSTEMS AND METHODS FOR PASSIVATION OF SERVO MOTORS

(75) Inventor: Zenon Szulyk, Mount Prospect, IL (US)

(73) Assignee: MPC Products Corporation, Skokie, IL (US)

( * ) Notice: Subject to any disclaimer, the term of this patent is extended or adjusted under 35 U.S.C. 154(b) by 81 days.

(21) Appl. No.: 10/345,537

(22) Filed: Jan. 16, 2003

(65) Prior Publication Data

US 2004/0140785 A1 Jul. 22, 2004

(51) Int. Cl.$^7$ .............................................. G05B 11/28
(52) U.S. Cl. ...................... 318/599; 318/254; 318/138; 318/439; 318/432; 318/563
(58) Field of Search ................................. 318/138, 254, 318/439, 599, 432, 563

(56) References Cited

U.S. PATENT DOCUMENTS

| | | | |
|---|---|---|---|
| 4,743,815 A | * 5/1988 | Gee et al. .................... | 318/254 |
| 5,091,680 A | * 2/1992 | Palm ......................... | 318/368 |
| 5,202,613 A | * 4/1993 | Kruse ........................ | 318/254 |
| 5,767,639 A | 6/1998 | Sakaguchi et al. | |
| 6,118,241 A | 9/2000 | Kazlauskas | |
| 6,160,368 A | 12/2000 | Plutowski | |
| 6,710,564 B1 | * 3/2004 | Shibuya et al. ............. | 318/439 |

* cited by examiner

Primary Examiner—Rina Duda
(74) Attorney, Agent, or Firm—Michael Best & Friedrich LLP

(57) ABSTRACT

Servo motor controls are disclosed for passivation in the event of failures with at least two independent control paths and validation of positional information. A sensor assembly generates signals indicative of the position of the motor rotor, and a signal validation detector is used to validate the generated signals and inhibit rotation of the motor rotor when the sensor assembly generates an invalid signal. A first information processor is provided in communication with the sensor assembly for receiving the generated signals to establish an A Lane decision-making channel control path to the PWM interface, and a second information processor is in communication with the sensor assembly to establish a B Lane decision-making channel control path to the PWM interface. Control logic provided with a PWM interface also inhibits rotation of the motor rotor when a decision from the A Lane differs from a decision from the B Lane. The commutation signal detector provides a state machine to validate the commutation and ensure the validity of signals indicating the position of the motor rotor from the sensor assembly.

20 Claims, 18 Drawing Sheets

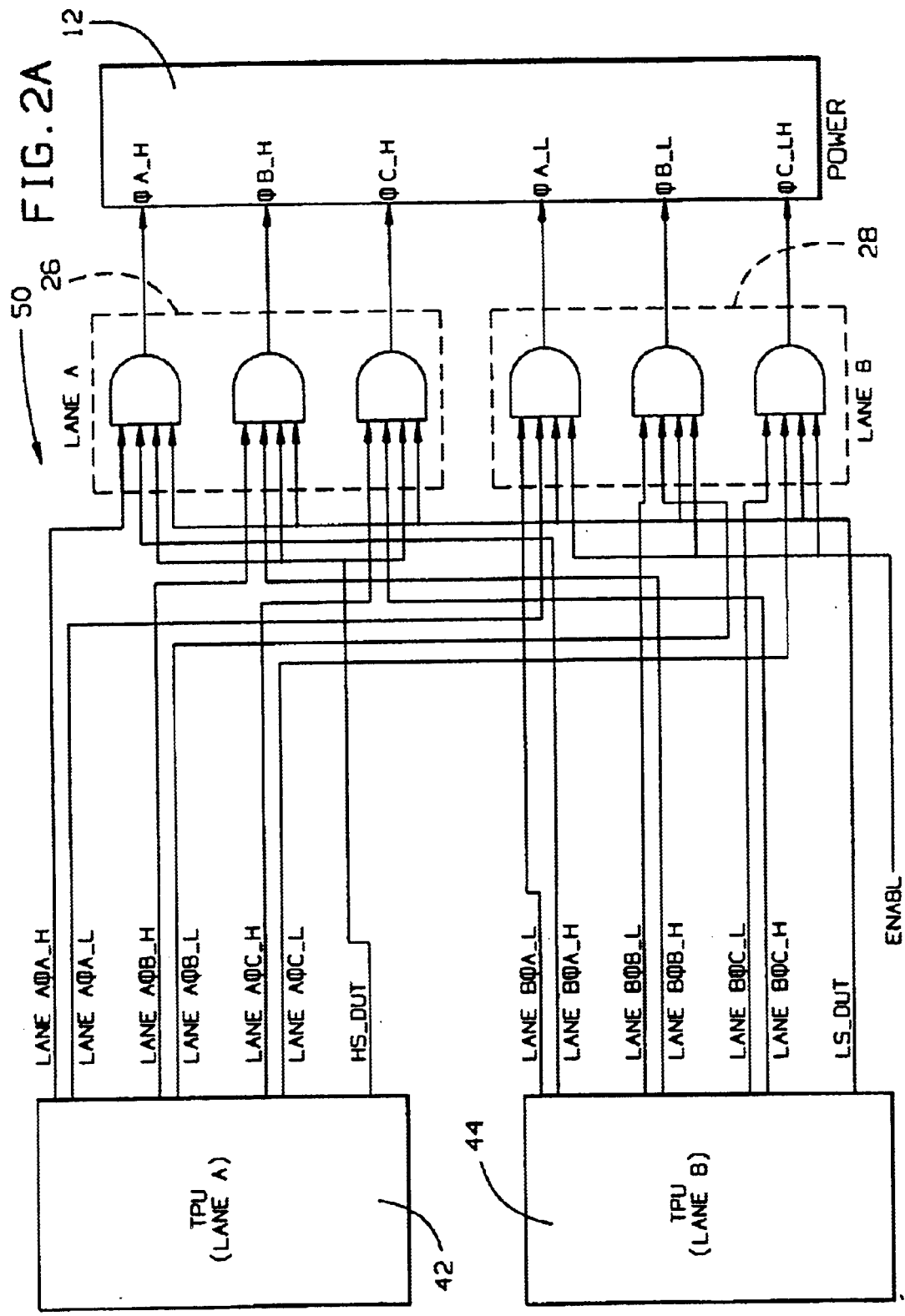

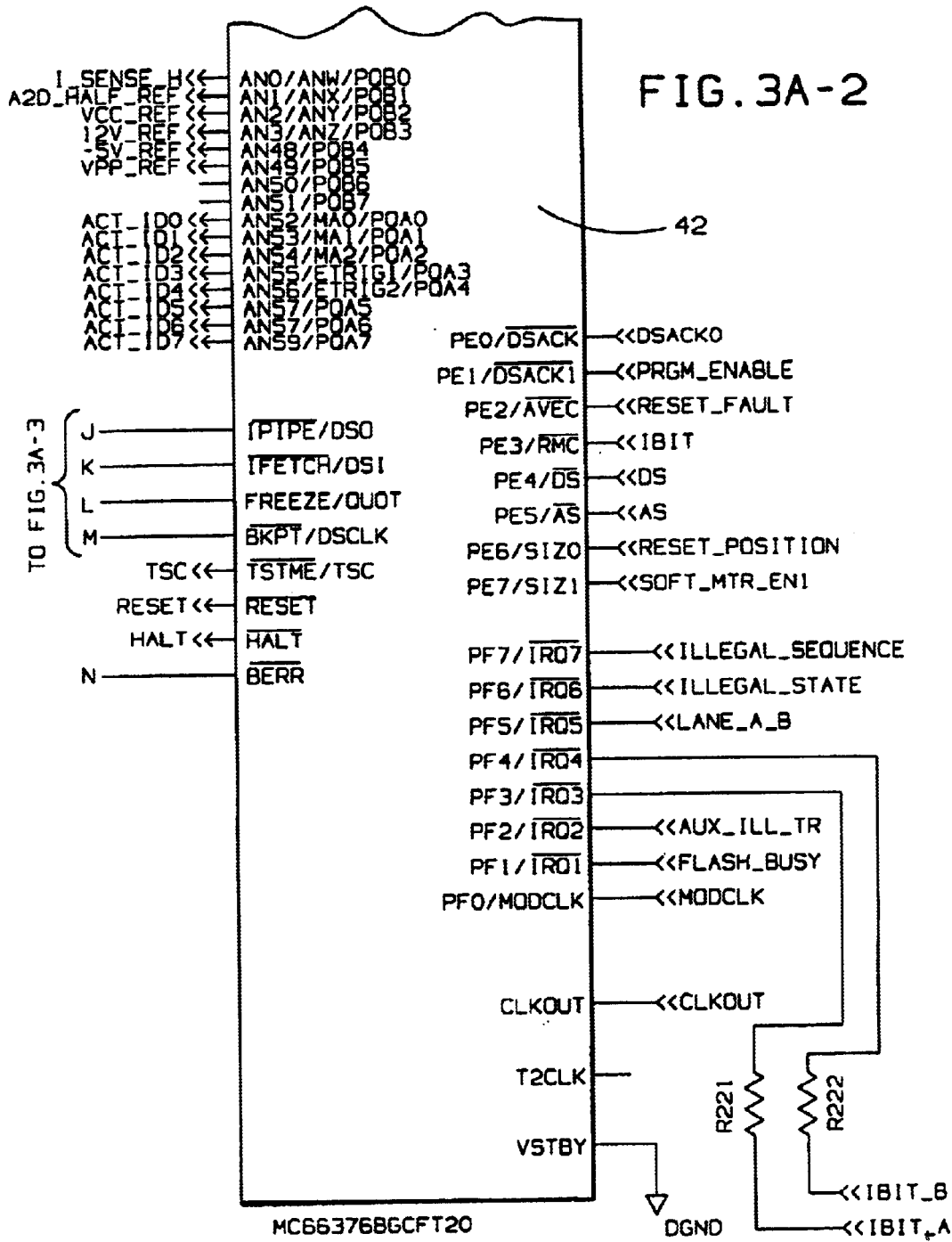

SYSTEMS AND METHODS FOR PASSIVATION OF SERVO MOTORS

BACKGROUND OF THE INVENTION

1. Field of the Invention

The present invention relates to systems and methods for controlling electric motors, and more particularly to controlling a power bridge for brushless, direct current (DC) motors for passivation of servos by inhibited motor rotor operation in the event of a failure.

2. Description of Related Art

In mission-critical applications, and in the aviation industry in particular, there is a need to have mechanical systems fail passively. To this end, motion devices such as electric motors are typically required to stop in their last pre-fault position in a locked state to prevent runaway or positional disturbances and the like in mechanical systems during failure.

Three-phase, brushless, direct current (DC) motors employing conventional designs have been used extensively in servo controls for mechanical systems. A typical brushless servo motor includes a permanent magnet rotor and three-phase stator windings. The windings of the servo motor are selectively excited in accordance with the angular position of the motor rotor by opening and closing switching transistors, e.g., a bipolar device, IGBT, FET or the like, to provide switching in a predetermined sequence. The angular position of the motor rotor is detected using a motor position assembly for sensing the position of the motor rotor using multiple, e.g., three position sensors in the form of Hall Effect Sensor (HES) elements disposed at angular spacing of 120 degrees in conventional three-phase designs.

Due to the need to use control electronics to control switching devices, a fault in the motor controller may cause incorrect motor operation, i.e., controller may cause incorrect motor operation, i.e., uncommanded motion. A failure of a commutation position sensor can cause unwanted movement by energizing the windings incorrectly. The use of the Hall Effect elements in the motor position assembly in the brushless DC motor may also fail in an unlocked runaway condition because of the control signals required for commutation. Therefore, in the design of control systems for brushless servo motors, it would be desirable to provide parallel decision-making capabilities for control circuitry associated with driver interfaces for powering the motor, and further provide sensor validation information processing to ensure passivation that inhibits rotation of the motor rotor in the event of system failures.

SUMMARY OF THE INVENTION

The passivation of servo motors is achieved by adding control systems providing plural independent control lanes in the operation of a conventional three-phase pulse width modulated (PWM) servo amplifier, providing that each control lane agrees on the magnitude of current in each phase. The PWM synchronization may be achieved with two independent PWM outputs from each of two channels, A and B Lanes, to control a three-phase power bridge for the DC motor. The PWM frame start is synchronized together by using a common start point, i.e., a clock that initiates the PWM cycle. Each independent control channel of A Lane and B Lane then uses motor rotor positional information to decide which power switching transistor is switched "on" along with the required torque or speed demand to calculate the amount of "On" time, after which the power switching transistor, e.g., field effect transistors (FETs) of the power bridge are gated "Off." Since each control channel independently has the ability to turn off the FETs of the power bridge, the channel that has the lower speed of torque demand wins, leaving the system in a fail-safe condition. Thus, by using PWM pulses formed from the common clock and requiring that the lower demand channel always shuts down the power switching, the voting always favors shutting down the system.

The two independent control sections include decision-making channel control paths, and a signal detector validation circuit control section to ensure that the commutation sensor is operating correctly in order to provide correct motor rotor position information. The validation control section ensures that the decision-making channel control paths are using valid position information for the PWM interface providing commutation for controlling the brushless DC motor. In a described embodiment, protection circuitry is also added to lock the top and bottom transistor switches "Off" to ensure no switching occurs.

Briefly summarized, the present invention relates to systems and methods for controlling brushless servo motors for motor rotor passivation in the event of failure. A PWM interface is provided to the power bridge for commutation of the brushless servo motor. A sensor assembly generates signals indicative of the position of the motor rotor, and a signal validation detector is used to validate the generated signals and inhibit rotation of the motor rotor when the sensor assembly generates an invalid signal. A first information processor is provided in communication with the sensor assembly for receiving the generated signals to establish an A Lane decision-making channel control path to the PWM interface, and a second information processor is in communication with the sensor assembly to establish a B Lane decision-making channel control path to the PWM interface. The PWM interface includes logic for interfacing the first information processor and the second information processor to the power bridge of the brushless servo motor, which receives signals from the PWM interface. The logic provided with the PWM interface also inhibits rotation of the motor rotor when a decision from the A Lane differs from a decision from the B Lane. The commutation signal detector provides a state machine to validate the commutation and ensure the validity of signals indicating the position of the motor rotor from the sensor assembly. The first and second information processors establishing the A Lane and B Lane respectively thus employ the validated position signals in the generation of commutation signals for the PWM interface from each decision-making channel control path.

BRIEF DESCRIPTION OF THE DRAWINGS

FIGS. 3A-1 through 3A-5 and 3B-1 through 3B-5 are schematic diagrams showing the microcontroller processor and programmable logic device (PLD) circuitry of A and B Lanes controlling the high-side drivers and low-side drivers of the power bridge respectively.

FIG. 5 is a motor control control loop flow diagram executed by the system to set the PWM duty cycle;

DETAILED DESCRIPTION OF THE PREFERRED EMBODIMENTS

Figure 1:
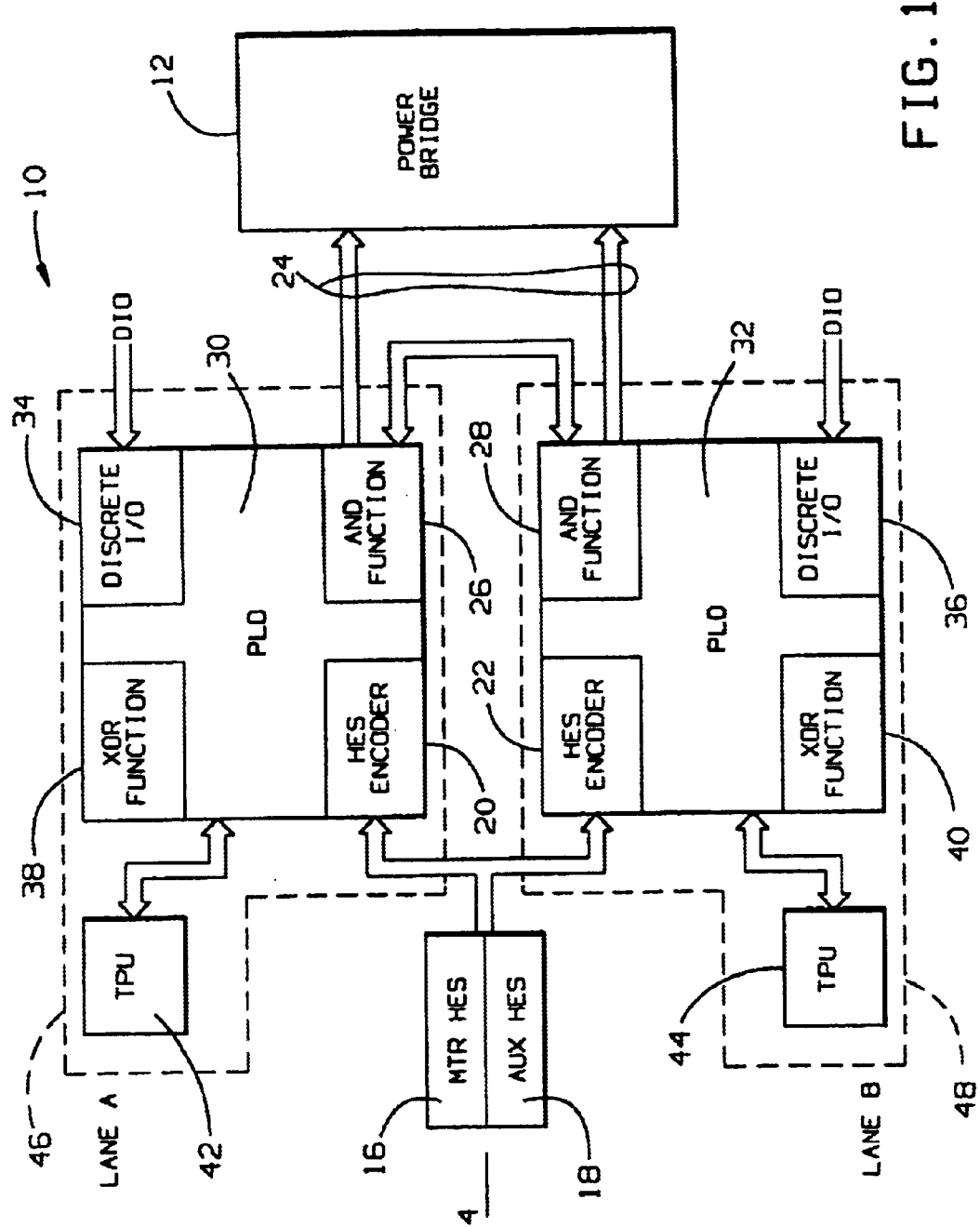
FIG. 1 is a block diagram showing a system for controlling a power bridge for a brushless DC motor with parallel decision-making channel control paths, A and B Lanes, for a pulse width modulated (PWM) interface allowing commutation from either lane to completely disable the motor in accordance with the invention.

With reference to the drawings and particularly FIG. 1, which illustrates an embodiment for controlling brushless motors, the system generally indicated at 10 is provided for controlling a power bridge 12, employing the described systems and methods for passivation of servo motors. A sensor assembly 14 includes a motor Hall Effect Sensor (HES) 16 and an auxiliary HES 18 for generating signals indicative of the position of the motor rotor, which are provided to HES encoders 20 and 22 of respective Programmable Logic Devices (PLDs) 30 and 32 discussed below to provide position counter information from the sensor assembly 14 for the implementation of independent decision-making channel control paths to a PWM interface 24, which provides commutation signals to the power bridge 12. As further discussed below, the PWM interface 24 derives signals from logical AND functions 26 and 28 implemented with PLDs 30 and 32. The PLDs 30 and 32 also provide input/output functions with discrete I/O 34 and 36, and XOR functionality 38 and 40 for each of the control paths implemented.

Plural control paths of the system 10 include a Motorola-type time processor unit (TPU) MC68376 microcontroller as a first information processor 42 and a second information processor 44 and PLDs 30, 32 as the core configuration. There are at least two control paths in the present described embodiment to provide a A Lane 46 and a B Lane 48 with additional ancillary components. The microcontrollers of the first and second processors 42 and 44 communicate serially with a Flight Director via a Serial Data Link peripheral on the MC68376.The system 10 receives desired modes and control commands via the Serial Data Link peripheral communications interface to transfer processing information. After monitoring the state of the system 10, the microcontrollers execute desired commands and report status. The frame rate for the microcontrollers is 248 msecs.

The first information processor 42 is provided commutation information from the commutation sensor assembly generating signals to establish the A Lane 46 decision-making channel control path to the PWM interface and the position sensor decoding logic, and the second information processor 44 is provided with the same commutation information to establish the B Lane 48 decision-making channel control path to the PWM interface and the position decoding logic. The PWM interface logic PLDs 30, 32 interface with the first information processor 42 and the second information processor 44 of the power bridge of the brushless servo motor, in addition to a synchronizing clock. If the two information processors 42, 44 disagree on which of the power switches needs to be on no switch is turned on allowing no winding to be energized. The logic 30, 32 provided with the PWM interface also inhibits rotation of the motor rotor when a decision from the A Lane 46 differs from a decision from the B Lane 48. The commutation signal detector provides a state machine to validate the commutation and ensure the validity of signals indicating the position of the motor rotor from the sensor assembly. Validation is done by determining the current position of the position sensor. There are only two valid next states: a valid clockwise rotation state or a valid counterclockwise rotation state. Any other state is incorrect and the information processor shuts down all power to the motor control by inhibiting the power switches (i.e., if we use the Hall Effect in a classic three-phase motor, there are 6 valid states and 2 invalid states, the valid states being 3, 1, 5, 4, 6, 2, 3, 1, etc. in the clockwise direction or 1, 3, 2, 6, 4, 5, 1, 3, etc. in the counterclockwise direction.

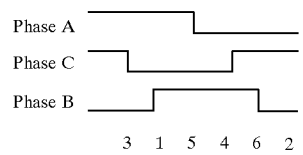

If we are in state 5 either state 1 or 4 is valid as next states and all other outputs are not possible. States 0 and 7 are not valid in this example so any state other than 1 or 4 would cause the system to remove power from the switch. The first and second information processors establishing the A Lane and B Lane, respectively, thus employ the validated position signals in the generation of commutation signals for the PWM interface from each decision-making channel control path.

Figure 2B:
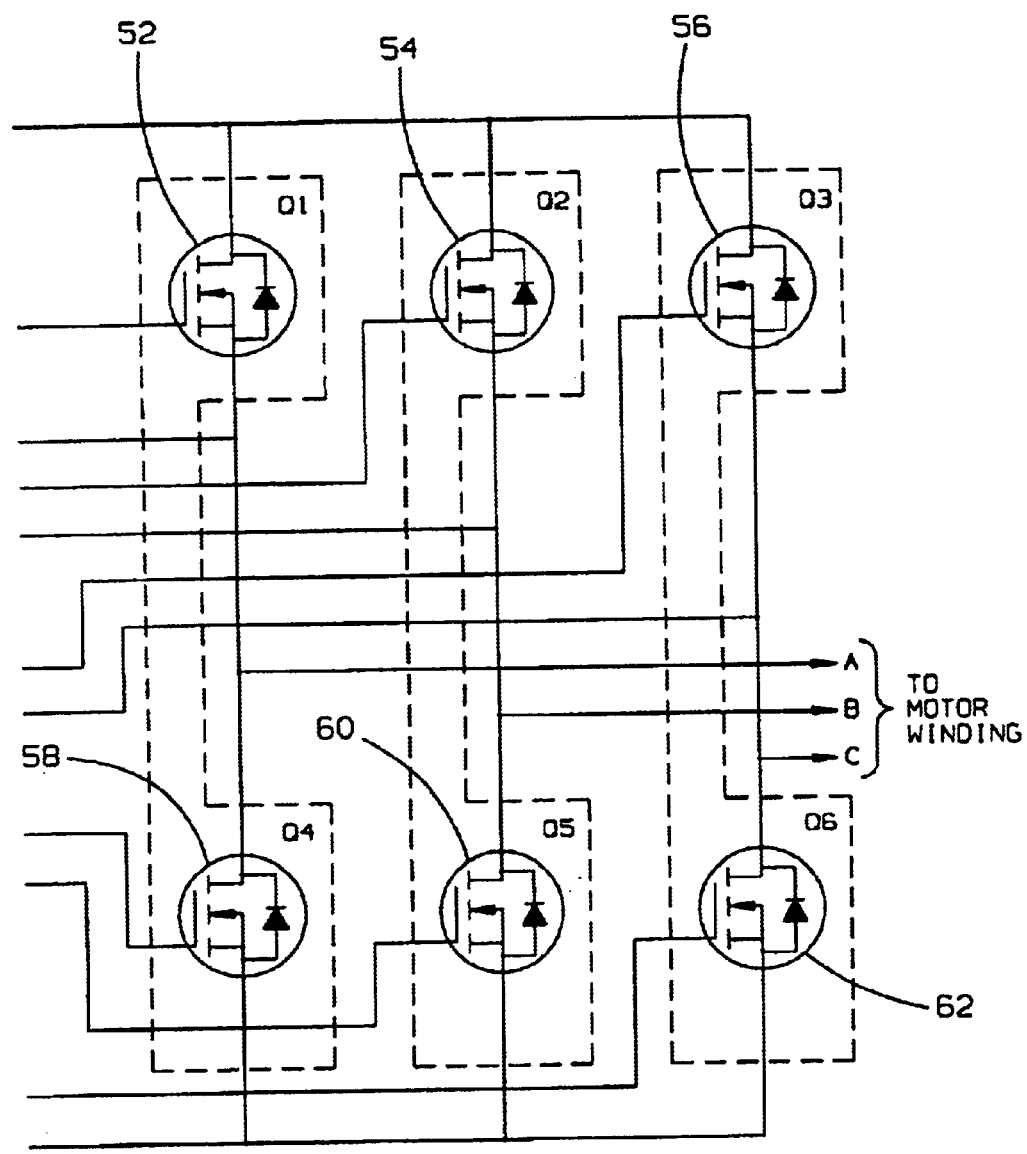
FIG. 2A is a schematic logic diagram, partially in block form showing the logical AND function of A and B Lanes to control a three-phase power bridge for the brushless DC motor with FIG. 2B showing the power switching devices of the power bridge in electrical schematic form.

The Serial Data Link peripheral components of the system 10 facilitate communications with the first information processor 42 and the second information processor 44, which includes initialization and TPU setup of control registers, interrupts, TPU channels and HES functionality including positional state initialization. Accordingly, the first information processor 42 is in communication with the sensor assembly 14 for receiving the generated signals to establish the A Lane 46 decision-making channel control path to the PWM interface 24. The second information processor is independently in communication with the sensor assembly 14, also for receiving the generated signals to establish the B Lane 48 decision-making channel control path to the PWM interface 24. The system 10 thus controls the power bridge 12 with the parallel decision-making control paths, allowing commutation from either lane to completely disable the motor. FIG. 2A illustrates the commutation control logic 50 with a schematic logic diagram, partially in block form, for implementing the logical AND functions 26 and 28 from PLDs 30, 32 for A and B Lanes to control the three-phase power bridge 12 from the first information processor 42 and the second information processor 44. FIG. 2B shows the power switching devices of the power bridge 12 in electrical schematic form with FETs 52, 54 and 56 provided as top transistor switches and FETs 58, 60 and 62 provided as bottom transistor switches for commutating the motor windings of the brushless DC motor. The two independent control sections include decision-making channel control paths and a signal detector validation circuit control section in communication with the sensor for generating signals indicative of the position of the motor rotor to validate the sensing of the motor rotor position information.

The PLDs 30, 32 are used to determine illegal states and transitions of the Hall Effect Sensors (HES) 16 and 18 of the sensor assembly 14 and set a discrete I/O pin at 34 or 36 when either has been detected. The PLDs 30, 32 also provide the incremental position of the system 10 actuator via the motor HES 16 and auxiliary HES 18. Performance of the actuator with redundant processors facilitates voting for determining that it is safe to turn on a given FET 52, 54, 56, 58, 60 or 62. Four motor control outputs (two per lane) are used to open or close a phase of the three-phase motor. Protection circuitry is also added to lock the top and bottom transistor switches "Off" to ensure no switching occurs.

One of the primary TPU outputs is used to generate a signal that represents the magnitude of the desired motor current. A numeric value generated by the microcontroller will be converted to a duty cycle that is proportional to the numeric value. The base frequency of the primary microcontrollers TPU shall be 20 KHz. The secondary microcontroller TPUs generate one signal that is a 100 percent duty cycle whenever there is a current demand and a zero duty cycle whenever there is no current demand. This is a nonlinear function. The HES decode function is a TPU input function that uses two or three channels to decode signals from the HES assembly into a state number. The choice of two or three channel mode is made during initialization. The primary purpose of this function is to decode the digital signals derived from the HES assembly in a brushless motor, along with a direction input from the CPU, into a state number that is passed to the commutation output TPU function (COMM) via a link request.

The decoded state number from the TPUs of first and second information processors 42, 44 represents the current angular position of the rotor. In response to the link, the COMM function outputs the commutation signals corresponding to this state, in order to turn the motor in the required direction. The PWM function is also provided, the output of which is gated by the COMM signals onto the motor phases. The HES and the direction of rotation generate the remaining motor control outputs (one per lane). In order to determine if a FET should be on, the TPU channel outputs for both lanes are ANDED together via the PLD to form a logical voting scheme. A disagreement in the voting will not allow the FET to be turned on.

Operation of the system shall corresponds to the following:

Lanes receive a position command from the Flight Director.

The PLD shall provide a current position that the MC68376 shall use to close the position loop.

Using the Hall Effect Sensors each lane shall generate via TPU channels two signals to be ANDED for a given phase. Therefore if both lanes do not agree the AND gate driver output shall be asserted low opening a given phase, inhibiting motor current.

The PLD 30, 32 functionality of the AND Function as illustrated in the block diagram of FIG. 2A performs the AND function for each respective A and B Lanes. The AND function of A Lane 46 controls the high-side drivers of a three-phase power bridge while the AND function of B Lane 48 controls low-side drivers of the power bridge. The PWM interface 24 includes logic for interfacing the first information processor 42 and the second information processor 44 to the power bridge 12, which receives signals from the PWM interface 24. The control logic provided with the PWM interface 24 inhibits rotation of the motor rotor when a decision from the A Lane 46 differs from a decision from the B Lane 48. The first and second information processors 42, 44 thereby establish the independent control lanes in the generation of the commutation signals for the PWM interface 24 from each decision-making channel providing that each control lane agrees on the magnitude of current in each phase. Both AND functions are used in conjunction to commutate the three-phase brushless DC motor. This AND function architecture also allows either lane to completely disable the motor, and ensures agreement between the plural control paths in the magnitude and current in each phase.

The AND function is implemented in each PLD 30, 32 as a collection of three four-input AND gates according to FIG. 2A.

The generic Boolean equation for each AND gate is determined by:

$$OUTPUT = INPUTA \cdot INPUTB \cdot DC\_HIGH \cdot DC\_LOW$$

where:
OUTPUT=AND gate output
INPUTA=motor phase control signal from A Lane
INPUTB motor phase control signal from B Lane
DC_HIGH=Pulse Width Modulated (PWM) duty cycle output from A Lane XOR Function
DC_LOW=PWM duty cycle from B Lane XOR Function The system PLDs 30 and 32 each provide eight input pins required by the AND function:

1. Phase A Pre-Drive (A Lane)
2. Phase A Pre-Drive (B Lane)
3. Phase B Pre-Drive (A Lane)
4. Phase B Pre-Drive (B Lane)
5. Phase C Pre-Drive (A Lane)
6. Phase C Pre-Drive (B Lane)
7. Duty Cycle (A Lane XOR Function Output)
8. Duty Cycle (B Lane XOR Function Output)

The B Lane 48 shall have a duty cycle under control of A Lane 46 input externally connected to VCC (5 VDC) and its duty cycle (B Lane 48) input connected to the B Lane XOR Function output. This configuration allows the B Lane AND function outputs to depend on the B Lane duty cycle and the selected low-side driver by both microcontrollers, and provides a gating signal from A Lane 46 to interlock signals from B Lane 48. Each lane of the PLDs 30, 32 performs the HES Encoder function. The HES Encoder functions are thus partitioned into two sub-functions: 1. Motor Hall Effect Sensor Encoder 20; and 2. Auxiliary Hall Effect Sensor Encoder 22. With the duty cycle control and HES encoder functionality, a signal detector validation circuit control section implemented with the PLDs 30, 32 is in communication with the sensor assembly 14 for receiving the generated signals to validate the sensing of the motor rotor position information.

The PLDs 30 and 32 thus provide sensor validation for inhibiting rotation of the motor rotor when the sensor assembly 14 generates an invalid signal. The validation control section ensures that the decision-making channel control paths are using valid position information for the PWM interface 24 providing commutation for controlling the brushless DC motor. The logic discussed herein provided with the PWM interface 24 couples the first information processor 42 and the second information processor 44 to the power bridge 12 of the brushless servo motor, such that the logic functions inhibit rotation of the motor rotor when a decision from the A Lane 46 differs from a decision of the B Lane 48.

The sensor assembly 14 of the system 10 further includes motor position and auxiliary position subassemblies as discussed for relative and incremental position information from the motor rotor. The motor position sub-assembly senses relative position information and the auxiliary position sub-assembly senses incremental position information. The signal detector validation circuit implemented in the TPU of first and second information processors 42, 44 provides a state machine to validate the commutation and ensure the validity of signals indicating the position of the motor rotor from the sensor assembly 14. Synchronization of the PWM signals is achieved with the two independent PWM outputs from the first and second information processors 42, 44 from each of the two channels, A and B Lanes, to control the power bridge 12 with a PWM frame start synchronized using a common clock that initiates a start point for the PWM cycle with respect to the motor rotor position information. Accordingly, the position subassemblies including motor and auxiliary HES 16 and 18 provide position counting for reflecting the relative position of the motor rotor with respect to a zero rotor position, as well as position-counting for sensing positional information from the motor rotor to reflect the incremental position with respect to a state change of the position counters.

The PLDs 30, 32 have inputs to reset the Motor HES 16 counter to zero and the Auxiliary HES 18 counter to zero, and provides an input to reset faults on the illegal state output, illegal transition output, and illegal auxiliary transition output. A logic 0 on the reset fault input pin shall indicate to reset the fault condition. The PLDs 30, 32 also have outputs that identify if an illegal motor HES state has been detected. This pin shall be set to logic 1 upon power on reset. A logic 0 level shall indicate an illegal motor HES state. In addition, an output identifies if an illegal motor HES state transition has been detected. This pin shall be set to logic 1 upon power on reset. A logic 0 level shall indicate an illegal motor HES state transition. The PLDs 30, 32 also provide an output that identifies if an illegal auxiliary HES state transition has been detected. This pin shall be set to logic 1 upon power on reset. A logic 0 level shall indicate an illegal auxiliary HES state transition.

With reference to FIGS. 3A-1 through 3A-5 and 3B-1 through 3B-5, schematic diagrams show the circuitry for implementing A Lane 46 and B Lane 48 for controlling the high-side drivers and the low-drivers respectively. In FIGS. 3A-1 through 3A-5, the first information procssor 42 communicates via an RS232 link 64, which facilitates the Serial Data Link peripheral functionality. The PLD 30 includes an interface 24' for controlling the high-side drivers. The A Lane 46 of the system 10 also uses memory components 60 and 68 in the form of 32K×16 random access memory (RAM). Similarly, FIGS. 3B-1 through 3B-5 show B 48 Lane implemented with the second information processor 44, which communicates with the Serial Data Link peripheral with an RS232 link 70, with a second information processor 44 using RAM 70 and 74. As shown, the PLD 32 employs a PWM interface 24" for controlling the low-side drivers to the power bridge 12. Accordingly, the high-side drivers 24' of FIGS. 3A-1 through 3A-5 and the low-side drivers 24" of FIGS. 3B-1 through 3B-5 facilitate the PWM interface 24 to the power bridge 12. Each independent lane of the system 10 illustrated in FIGS. 3A-1 through 3A-5 and 3B-1 through 3B-5, respectively, use the motor rotor positional information to calculate the amounts of "On" time, after which the high-side drivers and the low-side drivers, respectively, 24' and 24" are gated "off". Each control channel thus independently has the ability to turn off the high-side drivers and the low-side drivers 24' and 24" with voting that ensures that the lower force channel wins, leaving the system 10 in a fail-safe condition. Thus, the use of the PWM pulses formed independently in FIGS. 3A-1 through 3A-5 and 3B-1 through 3B-5 from the common clock requires that the lower current always shuts down the power switching for motor rotor passivation in the event of a failure.

The following describes the operation of the motor HES counter. The motor position counters provided by each PLD 30, 32 include a sixteen-bit counter that reflects the relative position of the motor rotor with respect to the zero rotor position. The microcontroller reads this relative position feedback from the PLD and uses this information as part of the position loop control algorithm. FIGS. 4A and 4B show state table and timing diagram representations of motor Hall Effect Sensor (HES) state transitions and counter operation used by the PLD of FIGS. 1, 3A-1 through 3A-5 and 3B-1 through 3B-5 to validate the motor Hall Effect sensor state transitions. The motor HES counter asynchronous input is reset to zero when: Power On Reset (POR) Input is logic 0; or Reset Position Input is logic 0. Each count transition of the motor HES counter is triggered by a state change of the motor HES.

The direction of rotation (DOR) of the motor rotor is calculated before the motor counter transition. The motor HES counter increases incrementally its count by one if the motor rotor is rotating counterclockwise (CCW) and decreases incrementally its count by one if the rotor is rotating clockwise (CW). The motor HES counter increases incrementally its count by one if the motor rotor is rotating counterclockwise (CCW) and decreases incrementally its count by one if the rotor is rotating clockwise (CW). A CCW rotation of the motor is defined as a CCW rotation of the drum with the observer facing the drum. The motor HES counter operation is disabled if an illegal motor HES state or transition has been detected, and the motor HES counter function resumes normal operation once the fault condition has been cleared. The PLDs 30, 32 thus validate the motor HES states according to FIGS. 4A and 4B and latch the invalid state output pin LOW if it detects that the motor HES state is all HIGH or all LOW.

The auxiliary HES function shall receive a synchronization signal from the motor HES function to latch the value of the auxiliary HES counter into a temporary register. The temporary register shall not update its value until the next motor HES read cycle. Meanwhile, the auxiliary HES counter shall continuously update its value during the read cycle.

For a three-phase brushless DC motor, there are six valid states out of eight possible motor HES states. The invalid state output pin is initialized HIGH (no errors) upon power on reset. The PLDs 30, 32 validate the motor HES state transitions and latch the invalid state transition output pin LOW if the transitions occur out of sequence. The invalid state transition output pin is initialized HIGH (no errors) upon power on reset. Upon execution of the motor HES counter read cycle, the value of the motor HES counter is latched into a temporary register. The temporary register does not update its value until the next read cycle. Meanwhile, the motor HES counter continuously updates its value during the read cycle. The temporary register output is tri-state buffered to make data available on the data bus during the read cycle. This function also outputs a synchronization signal to latch the auxiliary HES counter value at the same time the motor HES counter is read. This ensures that both counter values will contain the position at the same point in time.

An auxiliary HES position counter is provided as a five-bit counter by each PLD to its corresponding microcontroller. This counter reflects the incremental position of the motor rotor with respect to a state change in the motor HES. This increases the resolution of the position feedback because the auxiliary HES further subdivide each motor HES state change. This subdivision of the motor HES causes the microcontroller to read a higher resolution position feedback when combining the motor HES and auxiliary HES together than when using the motor HES alone.

A forty-eight-pole encoder from the motor provides the trigger mechanism to change the state of the auxiliary HES. The direction of rotation (DOR) of the motor rotor shall be calculated before the auxiliary counter transition. The auxiliary HES counter shall increment its value by one if the motor DOR is CCW or decrement its value by one if the motor DOR is CW. The auxiliary HES counter shall be disabled if an illegal motor HES state or transition has been detected. The auxiliary HES counter function shall resume normal operation once the fault condition has been cleared.

Each lane of the system 10 provides an XOR Function 38,40. The purpose of the XOR Function is to generate an output signal that represents the desired duty cycle of the control loop. The desired duty cycle output is the XORed combination of two PWM signals that are provided from the microcontroller. The output of the XOR Function shall be used as the duty cycle input to the AND function.

Figures 1, 3A:
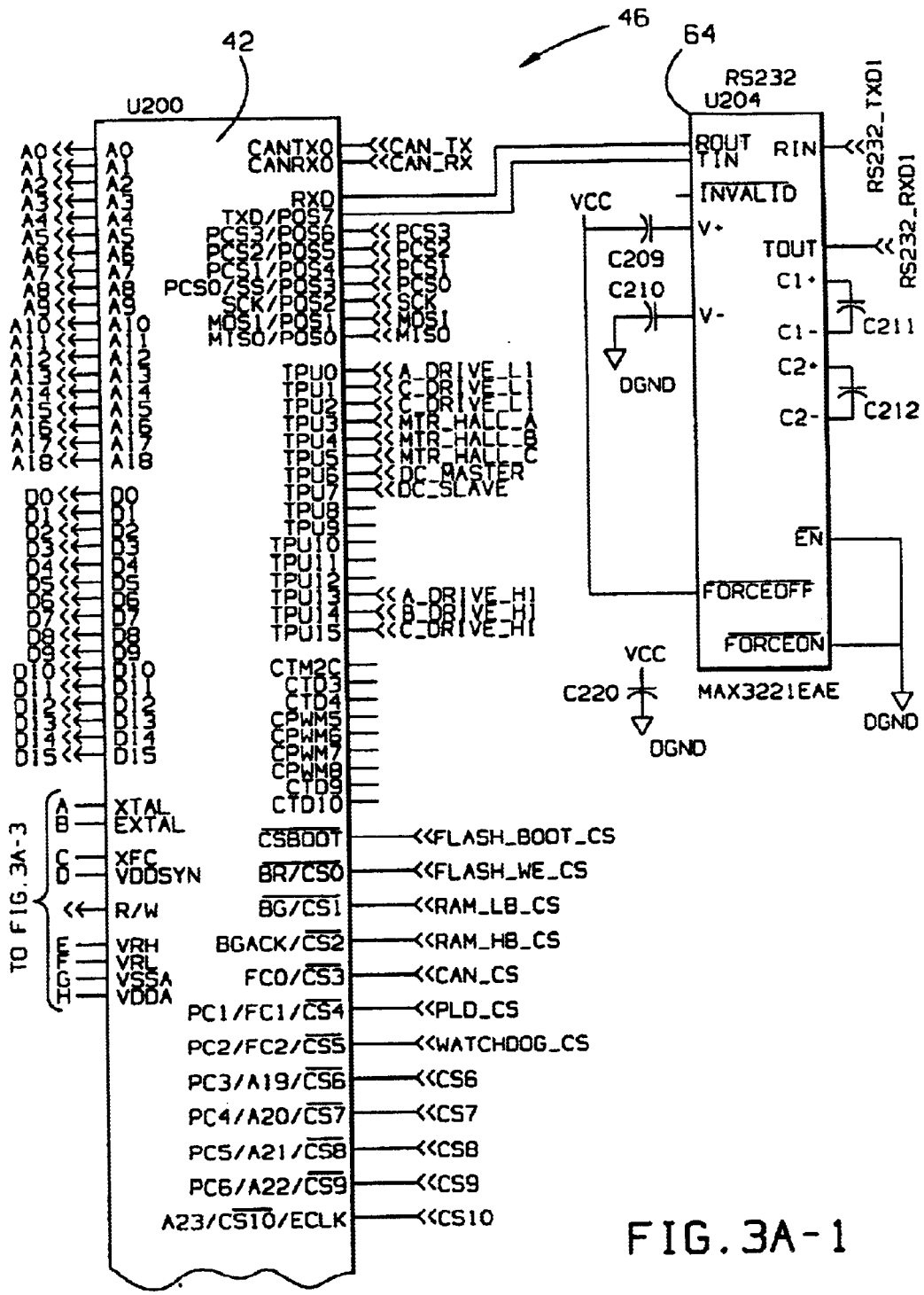
Figures 3, 3A:
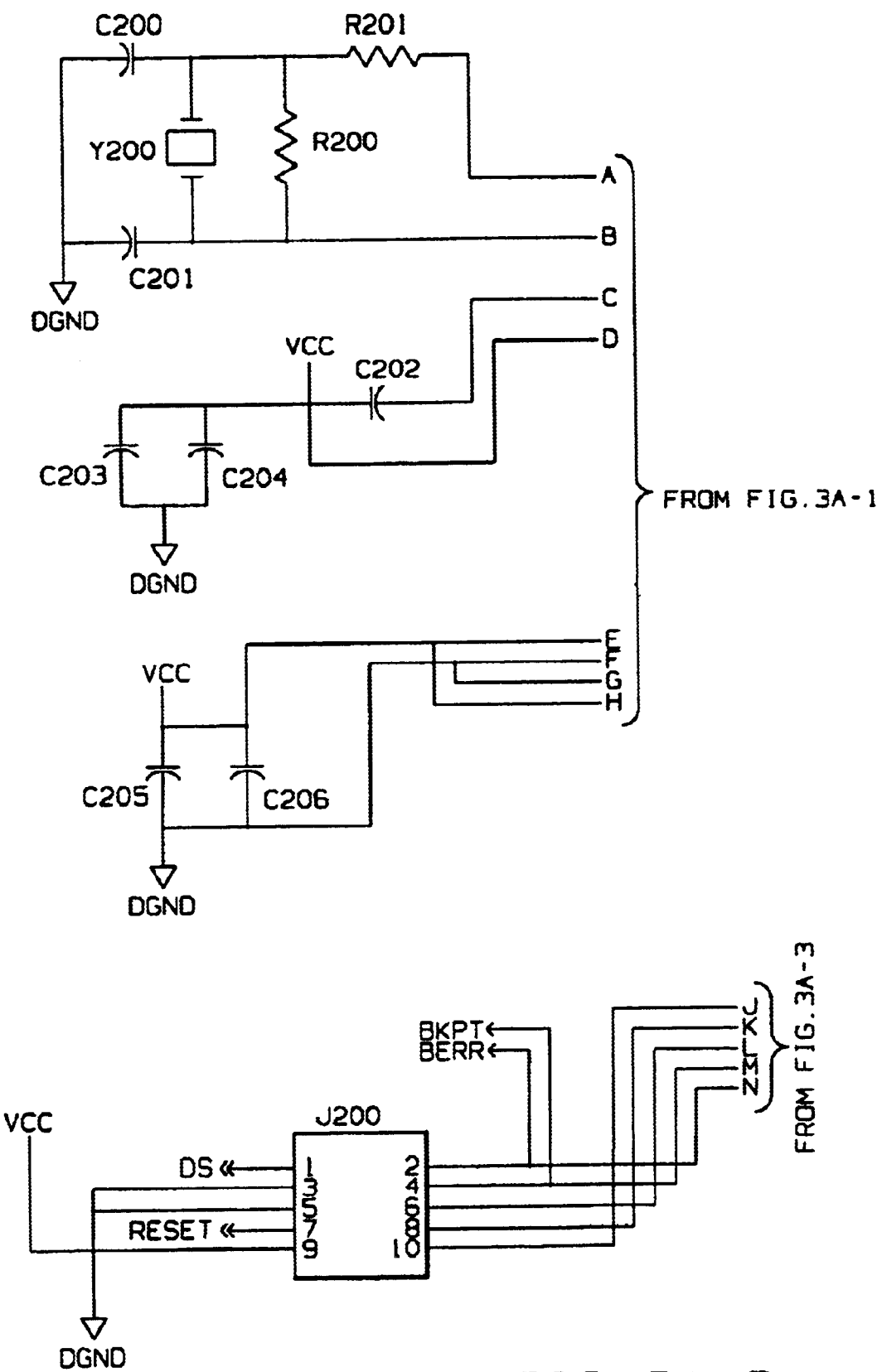
Figures 3, 3A, 4:
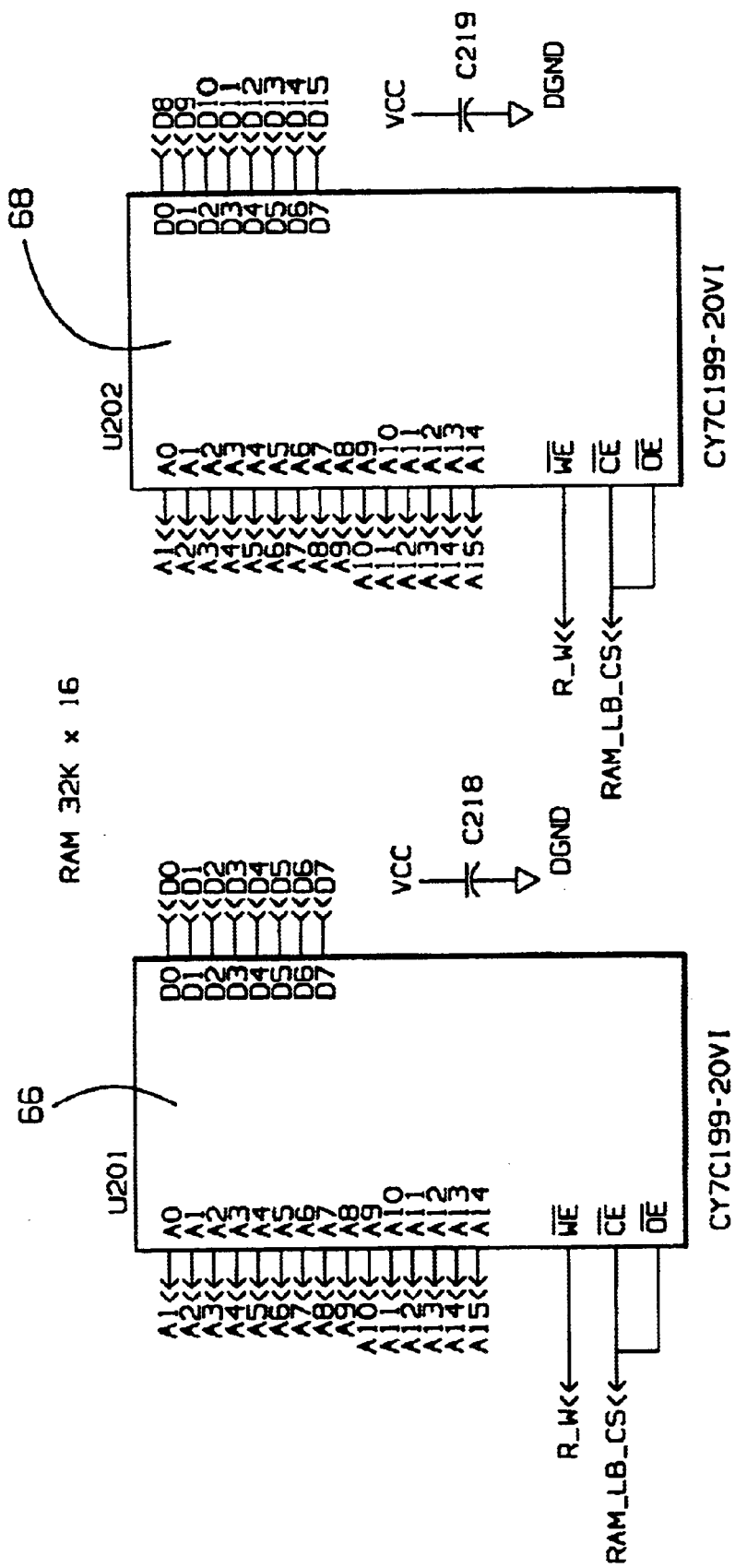
Figures 3, 3A, 4, 5:
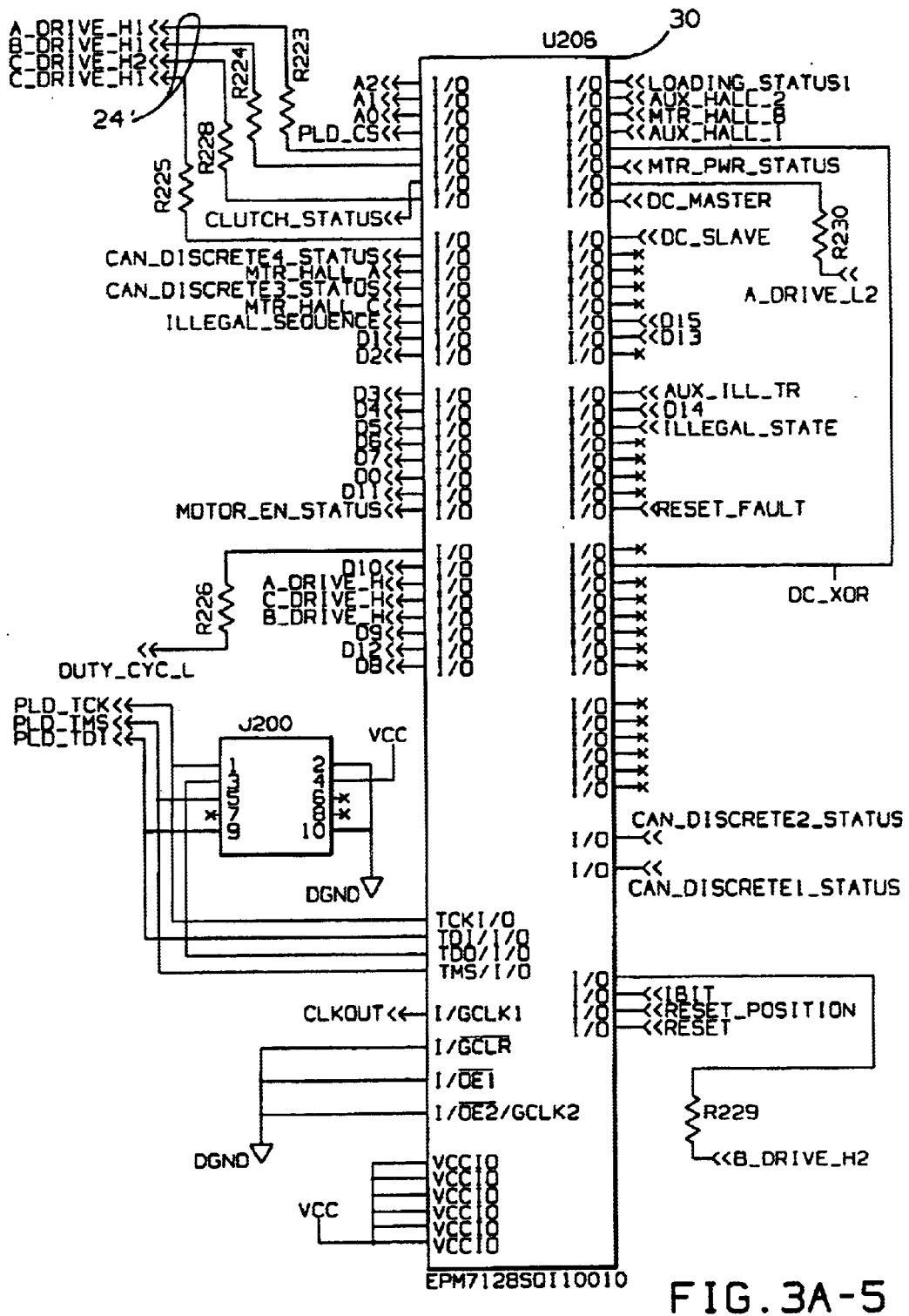
Figures 1, 3B:
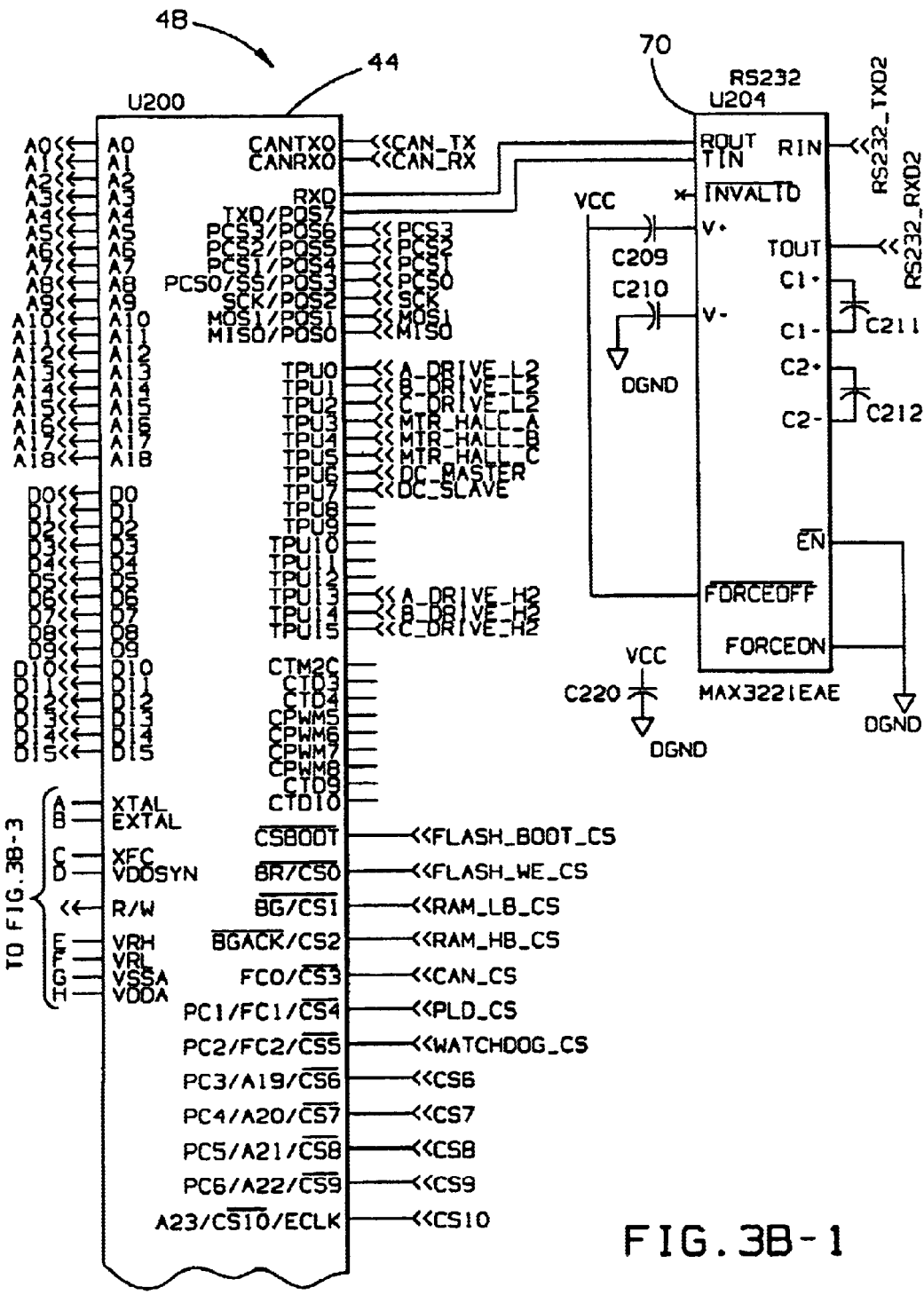
Figures 2, 3B:
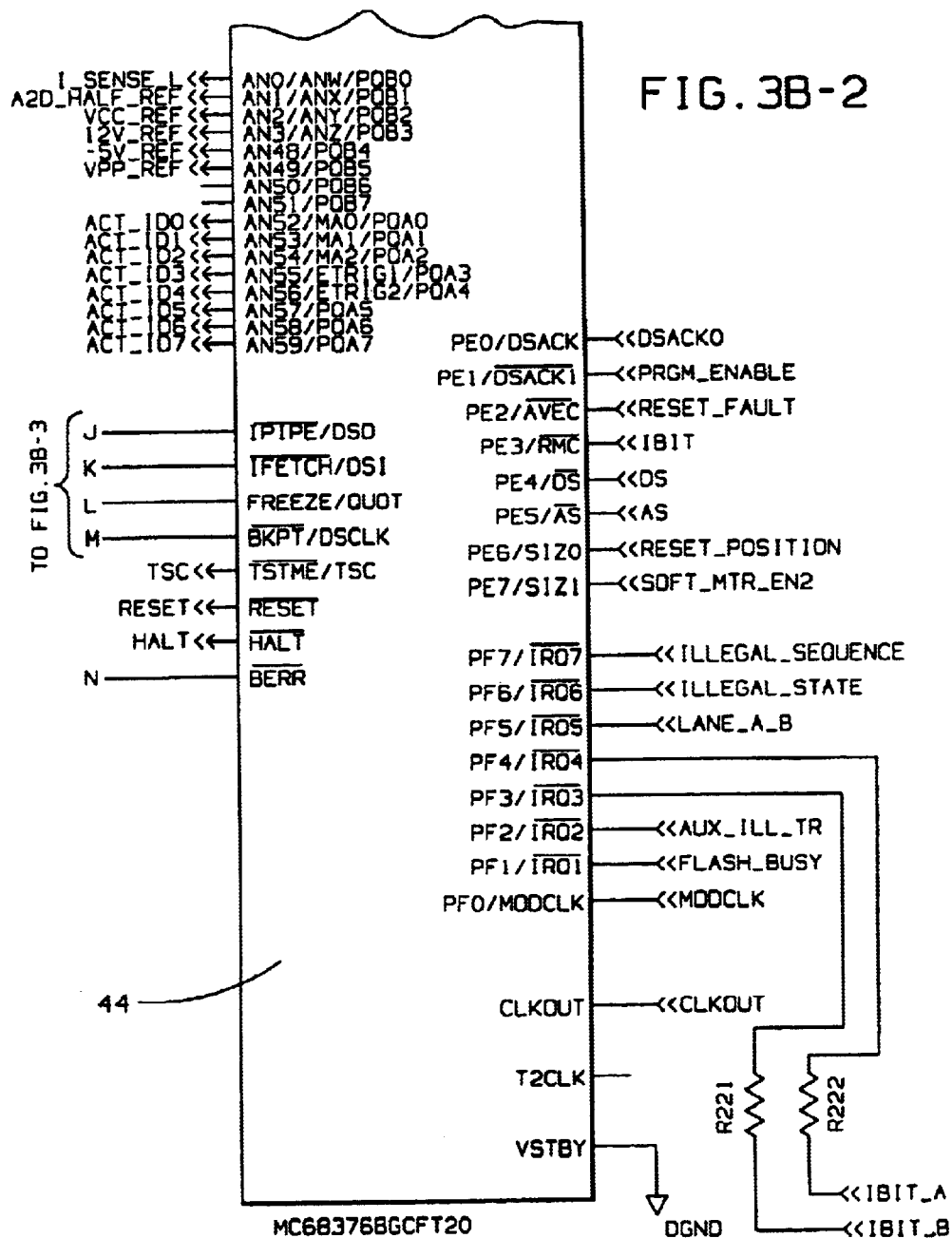
Figures 3, 3B:
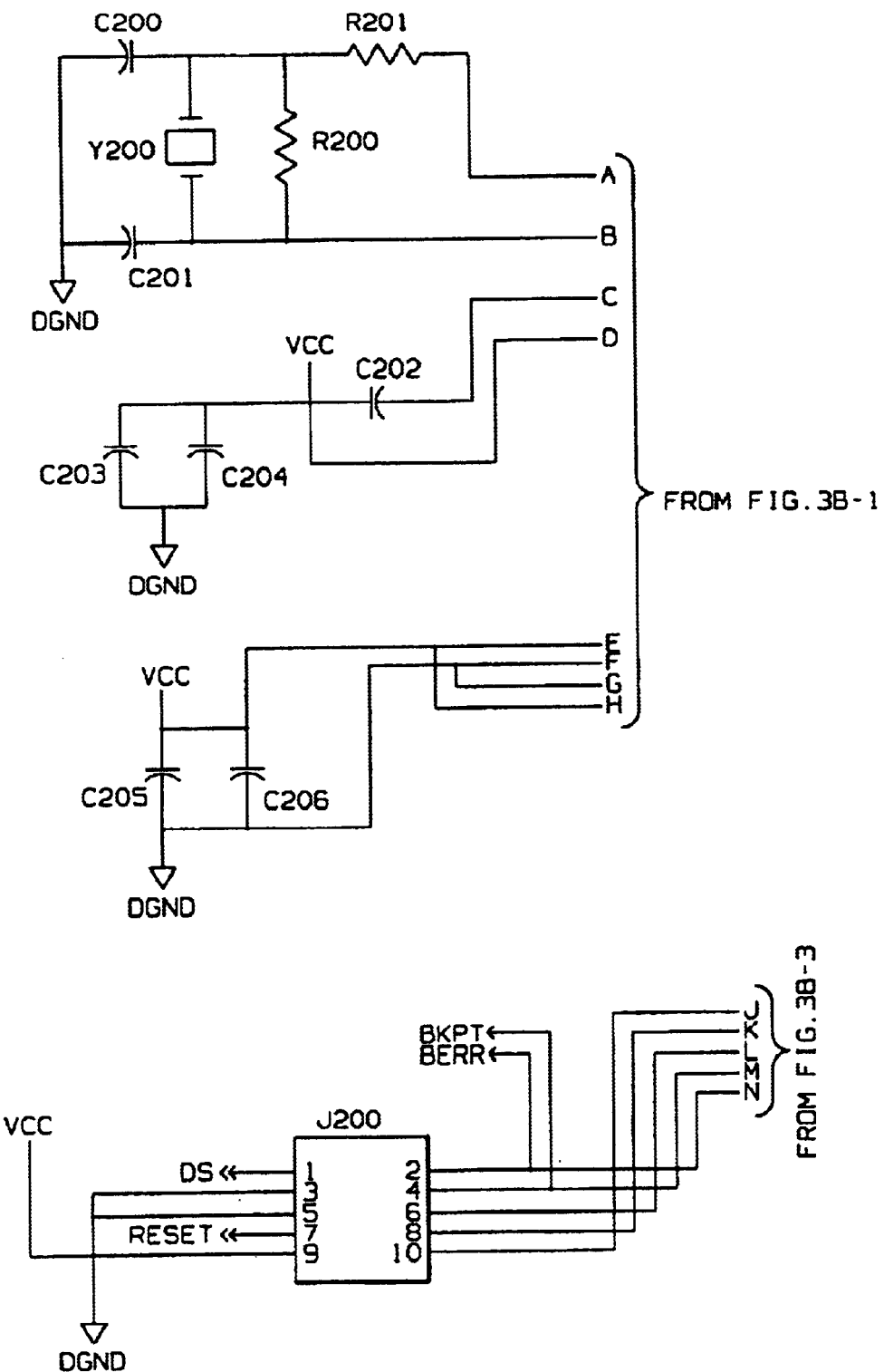
Figures 3, 3B, 4:
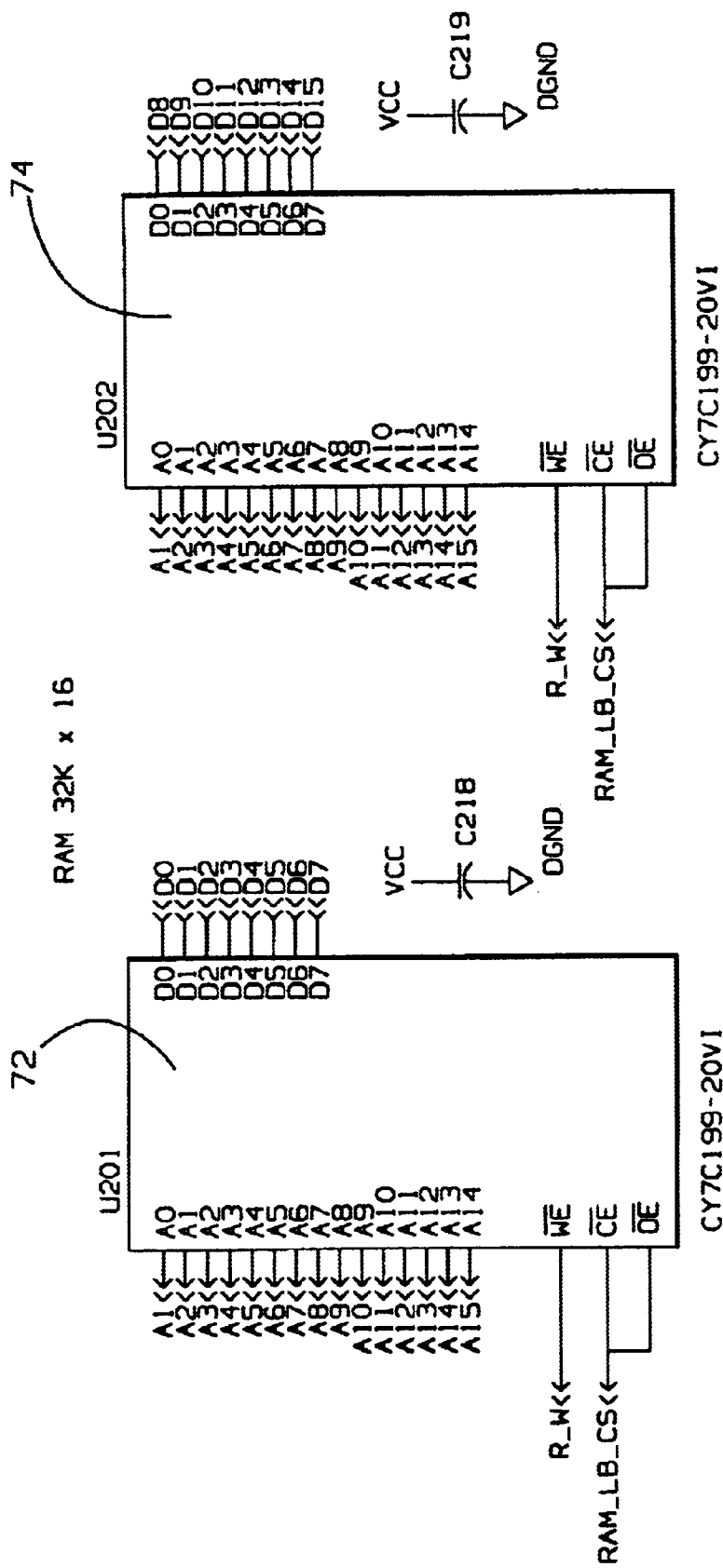
Figures 3, 3B, 4, 5:
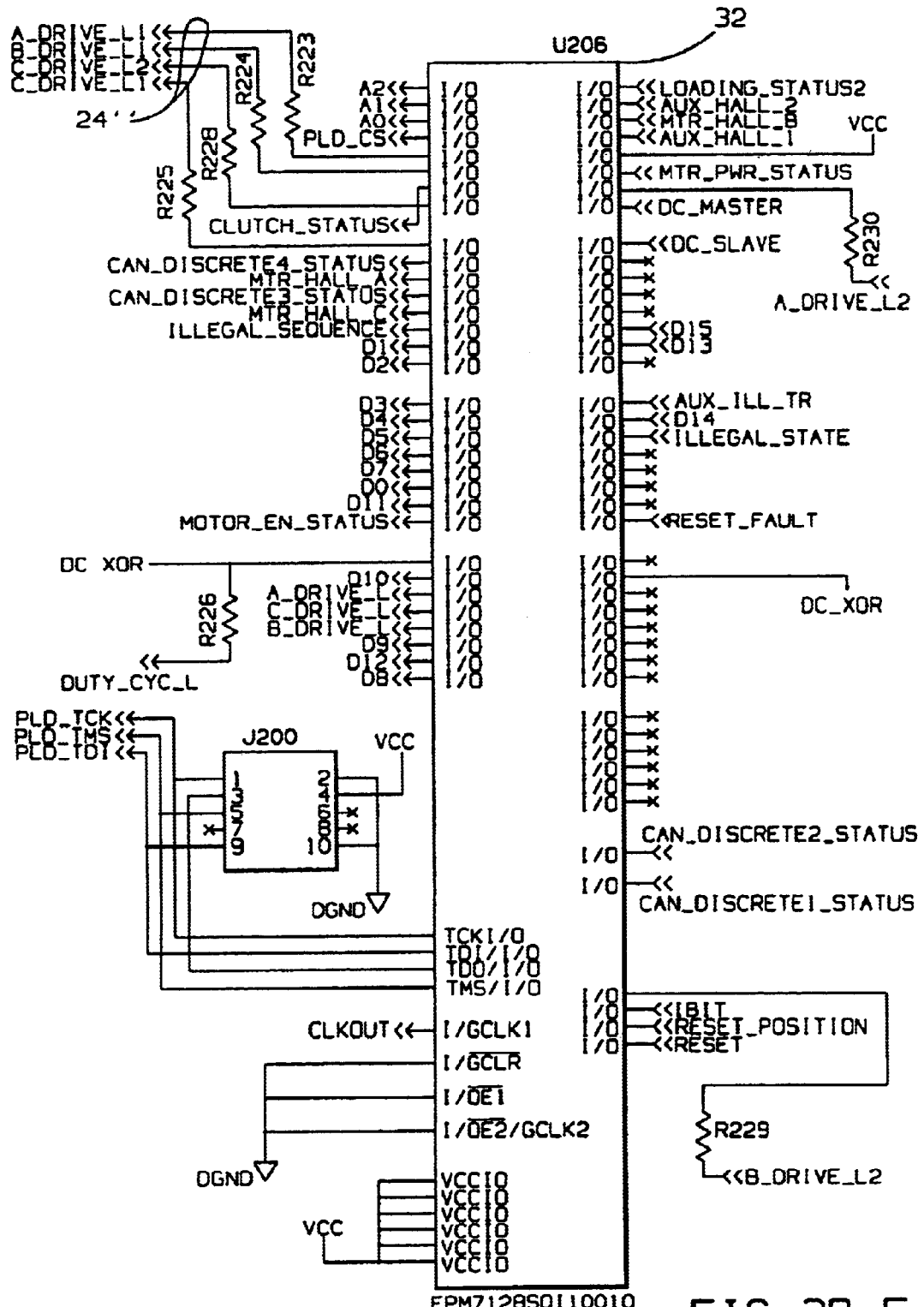
Figures 4A, 4B:
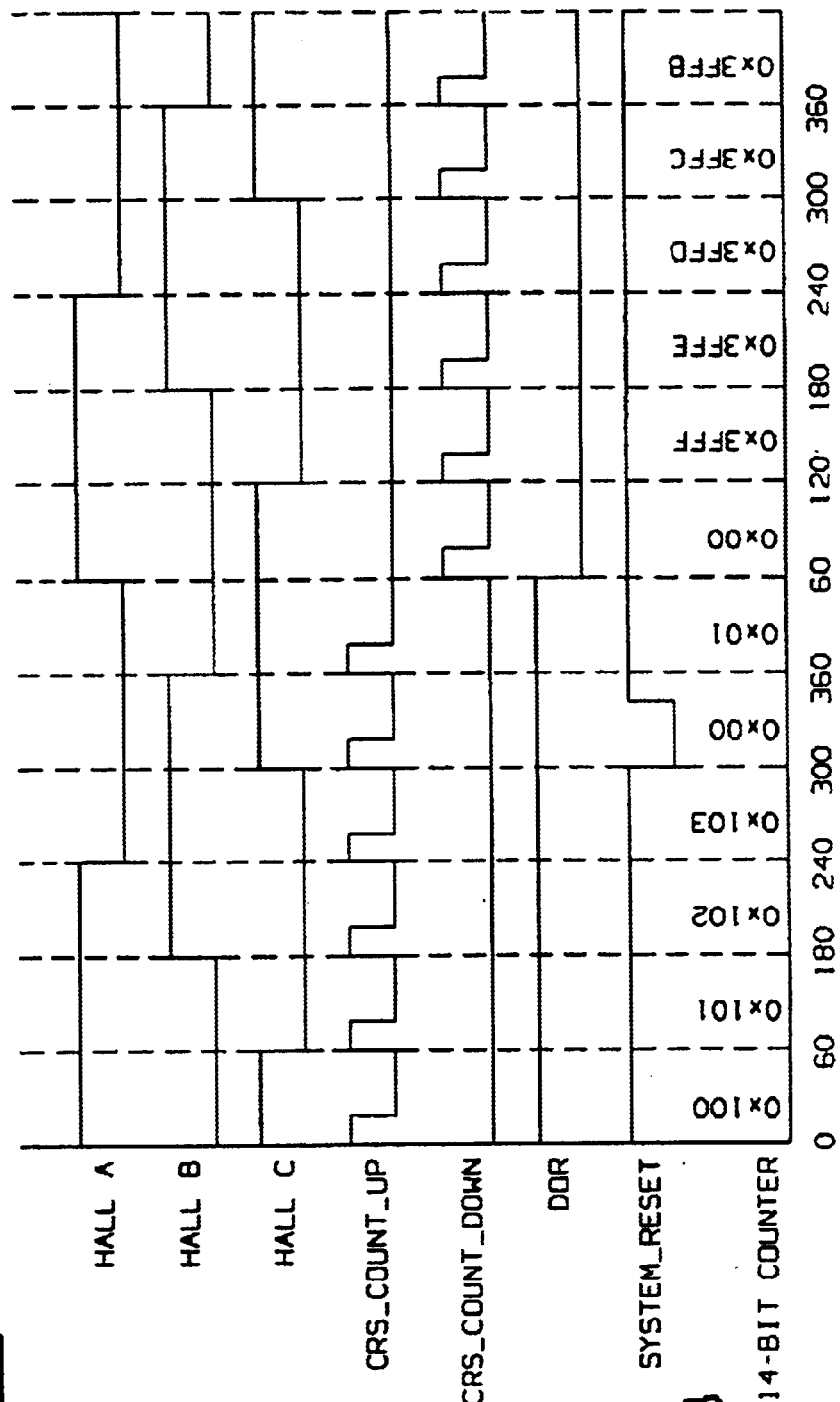
FIGS. 4A and 4B show state table and timing diagram representations of motor Hall Effect Sensor (HES) state transitions and counter operation used by the PLD of FIGS. 1, 3A-1 through 3A-5 and 3B-1 through 3B-5 to validate the motor Hall Effect sensor state transitions.
Figure 5:
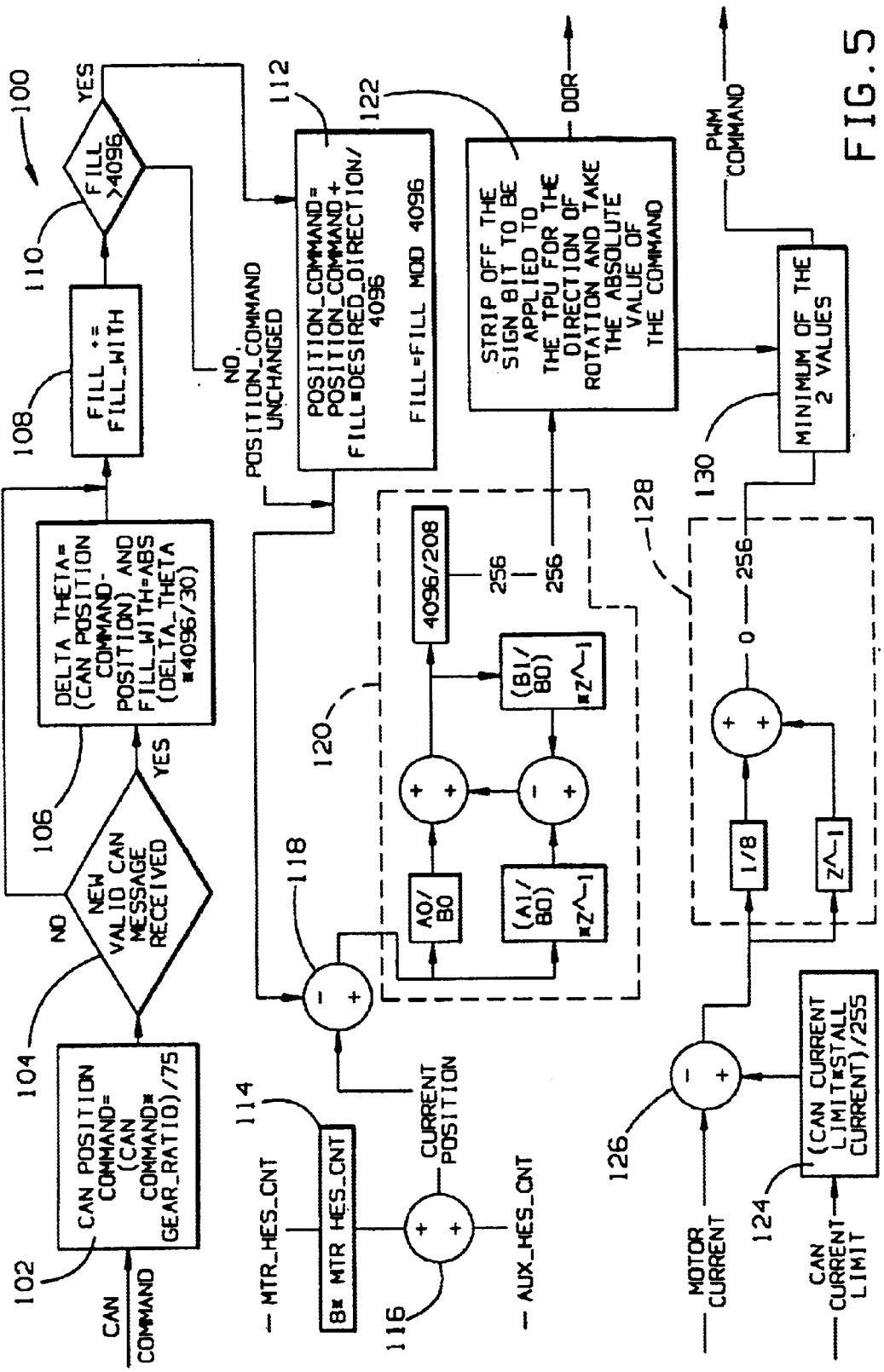

The XOR Function 38, 40 is implemented in each PLD 30, 32 as a single XOR gate. The generic Boolean equation for the XOR gate is determined by:

$$\text{OUTPUT} = \overline{\text{INPUTA}} \cdot \text{INPUTB} + \text{INPUTA} \cdot \overline{\text{INPUTB}}$$

where:

OUTPUT=XOR gate output (desired duty cycle)
INPUTA=master duty cycle signal from microcontroller
INPUTB=slave duty cycle signal from microcontroller With reference to FIG. 5, the motor control loop for establishing the PWM duty cycle to the power bridge 12 for controlling the brushless motor is illustrated in software flow diagram 100. The control loop algorithm is implemented independently on each of the first information processor 42 and the second information processor 44 using validated positional information from the PLDs 30, 32. The Serial Data Link peripheral communication interface communicates at 102 to provide a position command in reference to the gear-ratio of the motor. A determination is made at 104 if the valid message received represents a new position command. If a new position command has been received from the Serial Data Link interface, step 106 calculates delta theta as the command to the system 10 for updating the position of the motor rotor.

The position is updated at 108 and checked for a fill greater than sign 4096 limit at 110. If the update exceeds the 4096 limit, the position command is modified using a modulo 4096 count. The motor HES 16 count is scaled at 114 and summed with the auxiliary HES 18 count at 116 to compute a current position, which is differenced at 188 with the position command. A digital filter implemented at 120 with parameters as set forth in the coefficient table below, operates on the different signal from the position command and current position taking into account any dead band requirements to provide an output at 122, which uses the absolute value of the magnitude to be applied to the TPU of the respective information processor for the direction of rotation (DOR). The magnitude of current in each phase is scaled with respect to the current limit at 124 and differenced with the motor current to provide a signal filtered at 128, which is selected at 130 to provide the duty cycle output of the PWM command. The motor control loop executes every frame when the mode is either position loop or stand-by to enable or disable the motor based upon incremental position.

Figure 6A:
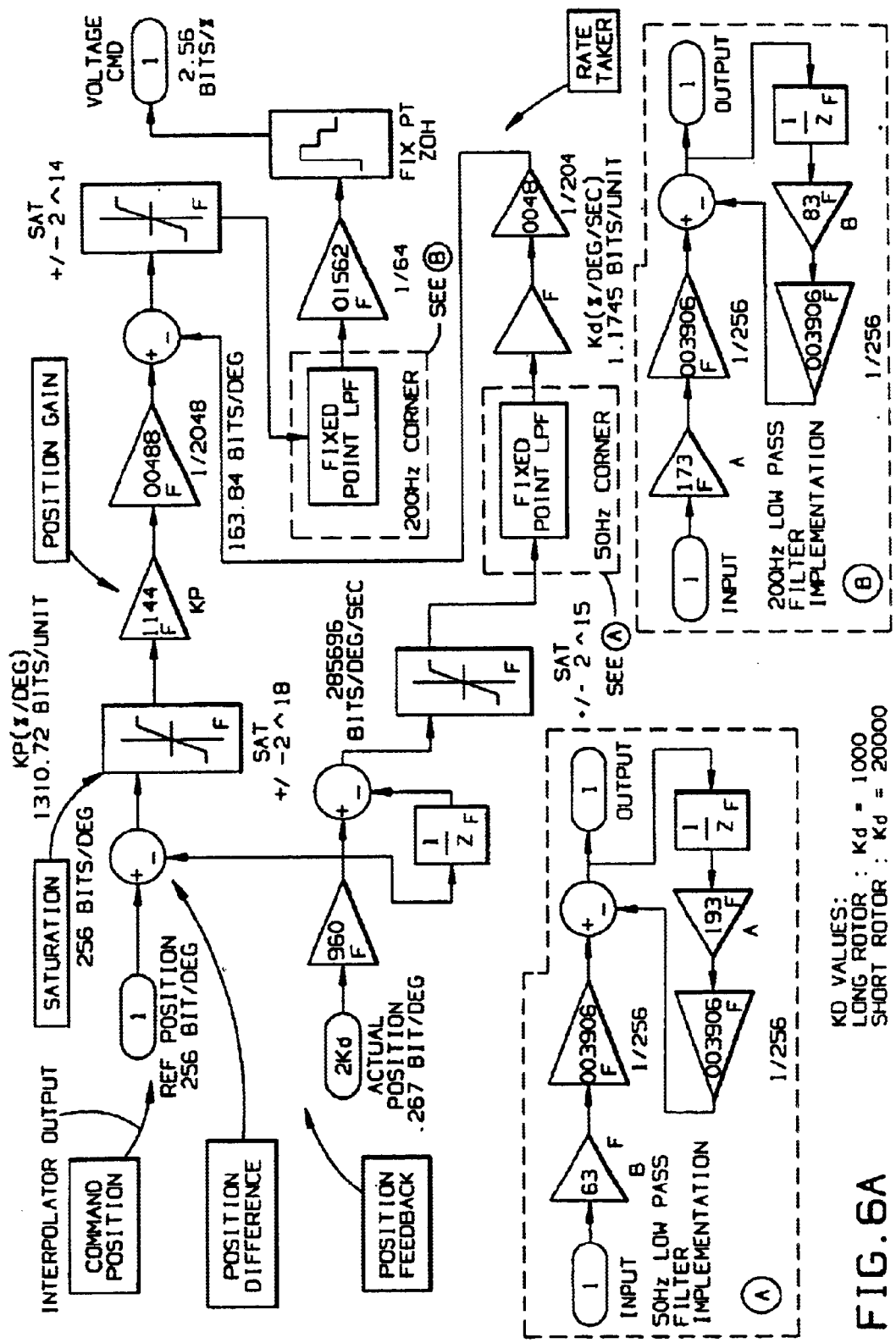
FIGS. 6A and 6B illustrate the control algorithm and gearhead dynamics block used to generate parameters for implementing the program control loop.

With reference to FIG. 6A, constants are used in the fixed point low-pass filter (LPF) 200 Hz block as well as in the Fixed point LPF 50 Hz block. These two blocks are used to compensate the servo motor. The commanded position is subtracted from the actual position by the difference block position difference. This difference is multiplied by the two gain blocks. The 1/2048 is a scaling block to ensure that the bits come out properly while KP is the actual gain factor. The position feedback is differentiated and run through a low pass filter to limit the bandwidth of the signal. Differentiated position provides a rate and hence the rate taker Kd is the rate loop gain and scaled by 1/2048 so the bits come out right. The position error is summed with the output of the rate taker and passed through low pass filter as well as another gain stage. This signal is then held for one frame in a zero order hold. The output of the zero order hold is the input of the pulse width modulator. The scaling of the pulse width modulator (PWM) is such that 28 VDC at the zero order hold equals 100%. This controls the power to the servo motor.

Figure 6B:
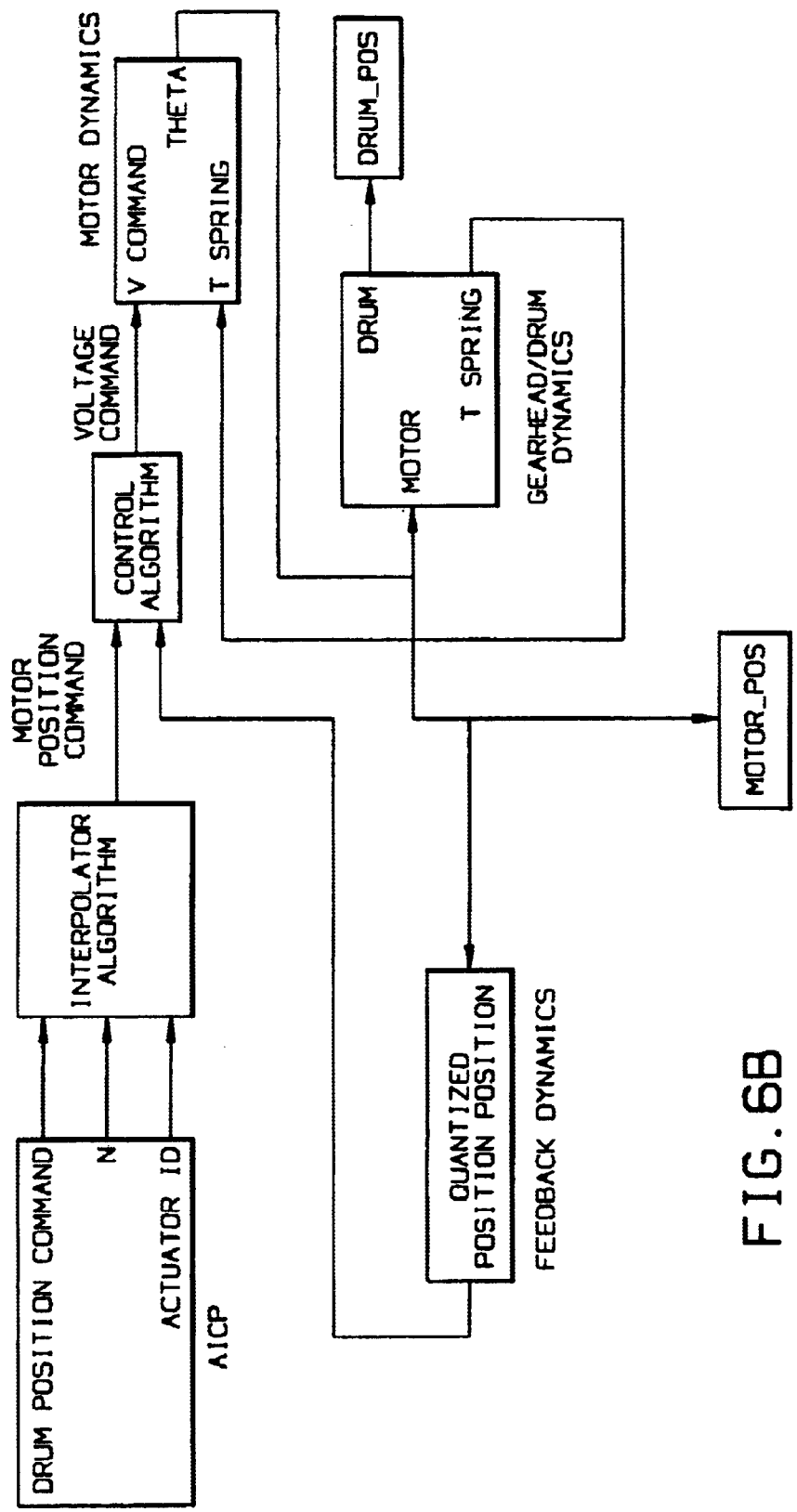

The implementation of the control algorithm illustrated in FIG. 6A facilitates the gear ratios used in the gearhead dynamics block at FIG. 6B. The gear ratios are used only for scaling the position. In FIG. 6B the motor control dynamics includes the motor model. In the motor dynamics block the voltage is converted to a current by multiplying the voltage by 1/resistance (V=I/R) of the winding. The current is converted into a torque using the torque constant of the motor. The torque is applied to the motor inertia, which generates an acceleration that is integrated into a rate. The rate generates a back Electro-Motive Force (EMF) that reduces the motor current as the motor increases speed. The speed is integrated and results in a position change. This position change drives the gearhead and is a ratio that is selected for a given servo characteristic. The gearhead includes the gear ratio based upon the load inertia, which is coupled through the springiness of the gearhead. This springiness and load inertia generates a torque disturbance on the motor, which is subtracted out from the motor torque.

Figure 7:
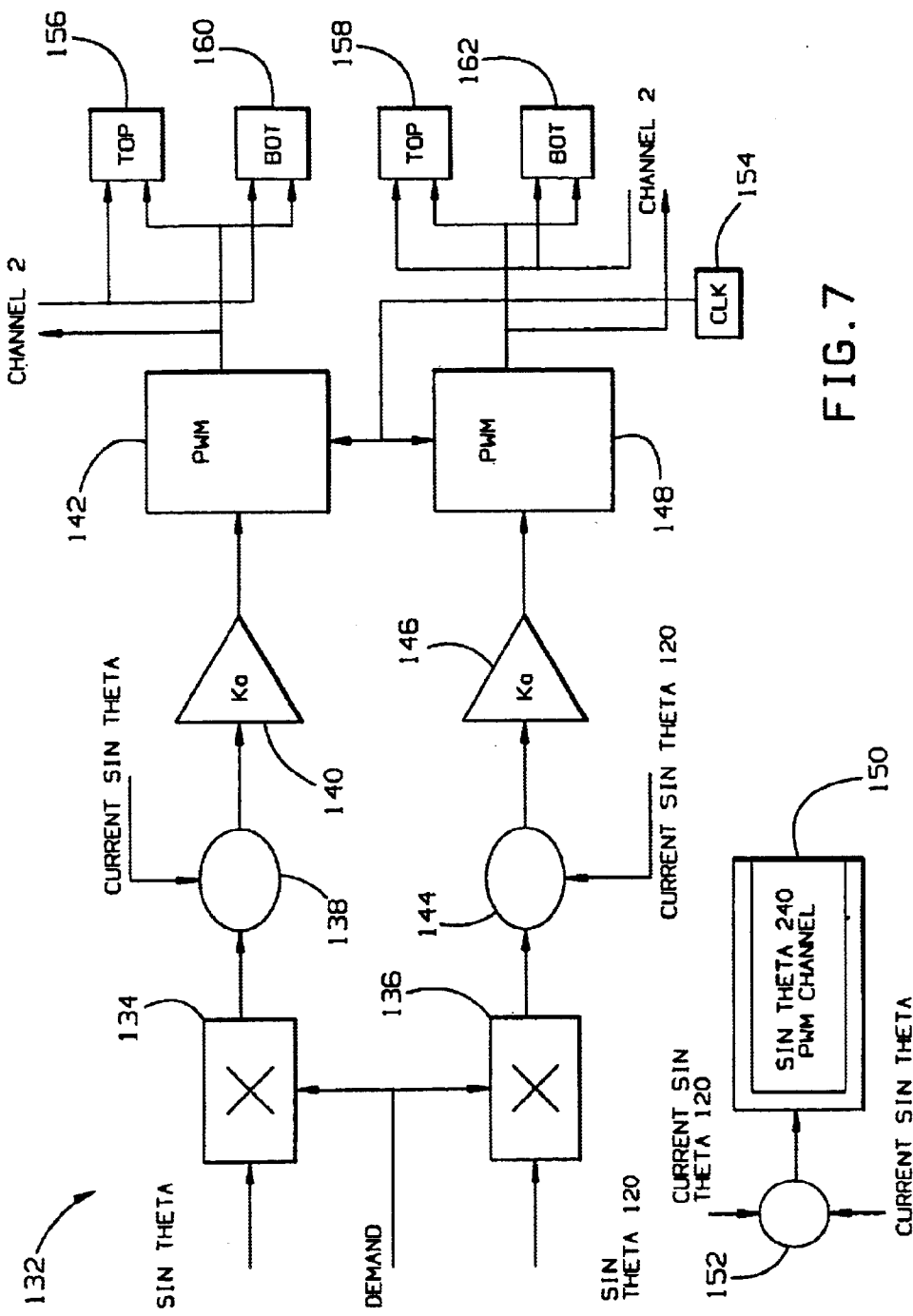
FIG. 7 shows an analog, sine commutative motor implementation in accordance with the present invention.

FIG. 7 shows an analog implementation for a sine wave commutation system 132 for a three-phase commutation using sine theta and sine theta (120 degrees) dated with a demand signal at 134 and 136 for channel 1. A second channel, channel 2 (not shown) provides independent PWM signals to the downstream top and bottom driver circuits. As shown for channel 1, the computed sine theta and current sine theta are differenced at 138 and a filter and amplifier 140 drives a PWM modulated duty cycle at 142. The 120 degree path is provided at difference element 144, amplifier 146 and PWM 148, and the 240-degree channel is implemented at 150 with a difference 152 from the current 120 degrees and current sine theta.

A clock source 154 gates the PWM duty cycles output from 142 and 148 to the top 156, 158 power bridge driver transistors and the bottom 160 and 162 power bridge driver transistors. As with the previously described embodiments, the analog implementation similarly provides for synchronization of the PWM signals achieved with independent decision-making channel control paths to the power bridge driver transistors 156, 158, 160 and 162 with the PWM frame start synchronized using the common clock as an initialization start point with respect to the motor rotor position information. Accordingly, with the implementation of validated positional information with each independent control channel lane, the alternate embodiment also ensures passivation that inhibits rotation of the motor rotor in the event of system failures.

While the present invention has been illustrated by a description of various embodiments and while these embodiments have been set forth in considerable detail, it is intended that the scope of the invention be defined by the appended claims. It will be appreciated by those skilled in the art that modifications to the foregoing preferred embodiments may be made in various aspects. It is deemed that the spirit and scope of the invention encompass such variations to the preferred embodiments as would be apparent to one of ordinary skill in the art and familiar with the teachings of the present application.

What is claimed is:

1. A system for controlling a power bridge for a brushless servo motor for motor rotor passivation in the event of a failure, the system comprising:
   a sensor assembly for generating signals indicative of the position of the motor rotor;
   a pulse width modulated (PWM) interface to the power bridge;
   a first information processor in communication with said sensor assembly for receiving the generated signals to establish an A Lane decision-making channel control path to the PWM interface;
   a second information processor in communication with said sensor assembly for receiving the generated signals to establish a B Lane decision-making channel control path to the PWM interface;
   a signal detector in communication with said sensor assembly for receiving the generated signals to validate the sensing of the motor rotor position information, said signal detector inhibiting rotation of the motor rotor when the sensor assembly generates an invalid signal; and
   said PWM interface comprising logic for interfacing said first information processor and said second information processor to the power bridge of the brushless servo motor, said logic inhibiting rotation of the motor rotor when a decision from the A Lane differs from a decision from the B Lane.

2. A system as recited in claim 1, wherein said sensor assembly comprises a motor position sub-assembly for sensing relative position information from the motor rotor.

3. A system as recited in claim 2, wherein said sensor assembly comprises an auxiliary position sub-assembly for sensing incremental position information from the motor rotor.

4. A system as recited in claim 2, wherein said motor position sub-assembly comprises a motor Hall Effect sensor position counter for reflecting the relative position of the motor rotor with respect to a zero rotor position.

5. A system as recited in claim 3, wherein said auxiliary position sub-assembly comprises an auxiliary Hall Effect sensor position counter for sensing positional information from motor rotor to reflect the incremental position of the motor rotor.

6. A system as recited in claim 5, wherein said auxiliary Hall Effect sensor position counter reflects the incremental position of the motor rotor with respect to a state change in the motor Hall Effect sensor position counter.

7. A system as recited in claim 1, wherein said signal detector is coupled to the logic of said PWM interface to disable the power bridge when said sensor assembly generates signals that are invalid.

8. A system as recited in claim 7, wherein said PWM interface comprises a servo amplifier.

9. A system as recited in claim 1, wherein said first information processor and said second information processor each comprise independent, redundant processing units for decoding the sensor assembly-generated signals to control the PWM interface to the power bridge to commutate the brushless servo motor.

10. A system as recited in claim 9, wherein said first information processor and said second information processor each comprise a time-processor unit comprising a microcontroller.

11. A system as recited in claim 1, wherein said signal detector comprises a programmable logic device for validating the sensing of the motor rotor position information from the sensor assembly.

12. A system as recited in claim 1, wherein the logic for interfacing said first information processor and said second information processor to the power bridge comprises a logical AND function of the A Lane decision-making channel and the B Lane decision-making channel requiring agreement of the control paths to commutate the brushless DC motor with the PDM interface.

13. A system as recited in claim 12, wherein said PWM interface ensures agreement between the A Lane control path and the B Lane control path on the magnitude of current in each phase.

14. A system as recited in claim 13, wherein the logic for interfacing said first information processor and said second information processor comprises a gating signal from the A Lane to interlock signals from the B Lane.

15. A system as recited in claim 13, wherein the AND function of the A Lane controls high-side drivers of the power bridge while the AND function of the B Lane controls low-side drivers of the power bridge to commutate the brushless servo motor.

16. A method of controlling a power bridge to a brushless servo motor for passivation in the event of a failure, comprising:
   generating signals indicative of the position of the motor rotor from a sensor assembly on the brushless servo motor;
   interfacing pulse with modulated (PWM) control signals to the power bridge;
   receiving the generated signals from the sensor assembly to establish an A Lane decision-making channel control path to the PWM control signals;
   receiving the generated signals to establish a B Lane decision-making channel control path to the PWM control signals;
   detecting the generated signals from the sensor assembly to validate the sensing of the motor rotor position information; and
   interfacing the A Lane, the B Lane and the detecting of the generated signals for validating the sensing of the motor rotor position information with a logic function interface for inhibiting rotation of the motor rotor when a decision from the A Lane differs from a decision from the B Lane or the signals generated for motor rotor position are invalid.

17. A method as recited in claim 16, wherein the generating step generates signals indicative of the relative position of the motor rotor.

18. A method as recited in claim 16, wherein the generating step comprises providing a counter for generating signals indicative of the incremental position of the motor rotor.

19. A method as recited in claim 16, wherein the receiving steps establish redundant decision-making channel control paths to the PWM control signals.

20. A system for controlling a power bridge to a brushless servo motor for passivation in the event of a failure, comprising:
   means for generating signals indicative of the position of the motor rotor from a sensor assembly on the brushless servo motor;
   means for interfacing pulse with modulated (PWM) control signals to the power bridge;
   means for receiving the generated signals from the sensor assembly to establish an A Lane decision-making channel control path to the PWM control signals;
   means for receiving the generated signals to establish a B Lane decision-making channel control path to the PWM control signals;
   means for detecting the generated signals from the sensor assembly to validate the sensing of the motor rotor position information; and
   means for interfacing the A Lane, the B Lane and the detecting of the generated signals for validating the sensing of the motor rotor position information with a logic function interface for inhibiting rotation of the motor rotor when a decision from the A Lane differs from a decision from the B Lane or the signals generated for motor rotor position are invalid.

* * * * *